(12) United States Patent
Kuo et al.

(10) Patent No.: US 8,837,389 B2
(45) Date of Patent: Sep. 16, 2014

(54) METHOD AND APPARATUS FOR HANDLING SEMI-PERSISTENT TRANSMISSION RESOURCES IN WIRELESS COMMUNICATION SYSTEM

(75) Inventors: Richard Lee-Chee Kuo, Taipei (TW); Li-Chih Tseng, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 553 days.

(21) Appl. No.: 12/986,797

(22) Filed: Jan. 7, 2011

(65) Prior Publication Data

US 2011/0170500 A1    Jul. 14, 2011

Related U.S. Application Data

(60) Provisional application No. 61/293,205, filed on Jan. 8, 2010.

(51) Int. Cl.
*H04W 4/00* (2009.01)
*H04W 72/04* (2009.01)

(52) U.S. Cl.
CPC .............. *H04W 72/042* (2013.01); *Y02B 60/50* (2013.01)
USPC .......................................................... 370/329

(58) Field of Classification Search
USPC ................... 370/310–349, 464–488
See application file for complete search history.

(56) References Cited

U.S. PATENT DOCUMENTS

| | | | |
|---|---|---|---|
| 2010/0113058 A1* | 5/2010 | Wu | 455/452.1 |
| 2010/0240372 A1* | 9/2010 | Wu | 455/436 |
| 2011/0105136 A1* | 5/2011 | Choi | 455/452.1 |
| 2011/0151882 A1* | 6/2011 | Hwang et al. | 455/450 |
| 2011/0310856 A1* | 12/2011 | Hariharan et al. | 370/336 |

FOREIGN PATENT DOCUMENTS

| | | |
|---|---|---|
| JP | 2009296588 A | 12/2009 |
| KR | 1020090020518 A | 2/2009 |

OTHER PUBLICATIONS

3GPP TSG RAN1 #56bis, Seoul, ROK, Jan. 23-27, 2009 (R1-091503).
3GPP TSG RAN WG1 Meeting #56, San Francisco, USA, May 4-8, 2009 (R1-091943).
Office Action on corresponding foreign application (JP 2011-000233) dated Aug. 7, 2012.
3GPP TSG-RAN WG2 Meeting #69bis, Beijing, P. R. China, Apr. 12-16, 2010.
3GPP TSG-RAN2 Meeting #69bis, Beijing, China, Apr. 12-16, 2010.
3GPP TSG RAN WG2 Meeting #67bis, Miyazaki, Japan, Oct. 12-Oct. 16, 2009 (R2-095487).

(Continued)

*Primary Examiner* — Kwang B Yao
*Assistant Examiner* — Juvena Loo
(74) *Attorney, Agent, or Firm* — Blue Capital Law Firm, P.C.

(57) ABSTRACT

A method for handling semi-persistent transmission resources in a network terminal of a wireless communication system is disclosed. The wireless communication system supports carrier aggregation and semi-persistent scheduling (SPS). Carrier aggregation enables a user equipment (UE) of the wireless communication system to perform transmission and/or reception using multiple carriers. The method includes steps of establishing an RRC connection via a cell containing an uplink carrier and a downlink carrier, configuring at least one downlink carrier to the UE via a first RRC message, and transmitting a physical downlink control channel (PDCCH) signaling addressed to an SPS cell radio network temporary identifier of the UE, to configure or reconfigure a semi-persistent transmission resource to the UE or to trigger an SPS retransmission.

6 Claims, 5 Drawing Sheets

(56) References Cited

OTHER PUBLICATIONS

3GPP TSG RAN WG2 Meeting #68, Jeju, Korea, Nov. 9-13, 2009 (R2-096961).

3GPP TSG RAN WG2 Meeting #68, Jeju Island, Korea, Nov. 9-13, 2009 (R2-096997).

Office Action on corresponding foreign application (KR10-2011-0001095) from KIPO dated Jan. 19, 2012.

* cited by examiner

METHOD AND APPARATUS FOR HANDLING SEMI-PERSISTENT TRANSMISSION RESOURCES IN WIRELESS COMMUNICATION SYSTEM

CROSS REFERENCE TO RELATED APPLICATIONS

This application claims the benefit of U.S. Provisional Application No. 61/293,205, filed on Jan. 8, 2010 and titled "Method and Apparatus of MCCH Information Acquisition Procedure in a Wireless Communication System," the contents of which are incorporated herein by reference.

BACKGROUND

The present invention relates to wireless communication systems and, more particularly, to a method and apparatus capable of effectively handling semi-persistent scheduling (SPS) of transmission resources.

The Long Term Evolution wireless communication system (LTE system), an advanced high-speed wireless communication system, supports only packet-switched transmission. The LTE system includes two scheduling methods: dynamic scheduling (DS) and semi-persistent scheduling (SPS). For DS, a network terminal dynamically allocates resources by transmitting control signaling on a physical downlink control channel (PDCCH) to user equipments (UEs). The resources, e.g., certain frequencies and time slots, allocated for data reception or transmission may vary according to requirements, such as traffic volume and quality of service (QoS). For SPS, in order to serve upper layer applications that generate semi-statically sized data periodically, e.g., voice over Internet protocol (VoIP) services, the network terminal allocates periodic semi-persistent resources to UEs. This reduces control signaling sent on a PDCCH and enhances system scheduling performance. Using SPS, the UE can periodically perform data transmission without receiving additional PDCCH signaling.

The resources assigned by DS are addressed to a cell radio network temporary identifier (C-RNTI) of the UE. The resources assigned by SPS are addressed to an SPS C-RNTI of the UE. The SPS C-RNTI is a specific UE identity assigned by the network terminal via a radio resource control (RRC) layer. The SPS C-RNTI is mainly used for configuring or reconfiguring an SPS resource and for indicating SPS retransmissions. In detail, when the UE has an assigned SPS C-RNTI, the UE needs to monitor its SPS C-RNTI on the PDCCH to determine subsequent operations according to a new data indicator (NDI) included in the PDCCH. If the value of the NDI is 0, it signals that the SPS resource needs to be configured or reconfigured. If the value of the NDI is 1, it signals SPS retransmission.

The 3rd Generation Partnership Project (3GPP) has started to specify a next generation of the LTE system: the LTE Advanced (LTE-A) system. Carrier aggregation (CA), for which two or more component carriers are aggregated, is included in into the LTE-A system to support wider transmission bandwidth, e.g., up to 100 MHz, and for spectrum aggregation. In other words, in the LTE-A system, a UE may utilize multiple subcarriers for data transmission with a network terminal to enhance transmission bandwidth and spectrum efficiency.

Using CA, after a UE establishes an RRC connection with a network terminal via a cell (which contains an uplink subcarrier and a downlink subcarrier), the network terminal can configure one or more downlink subcarriers to the UE via an RRC message, such that the UE can simultaneously utilize multiple subcarriers to perform data transmission. If the network terminal uses SPS, the UE may need to monitor PDCCHs of many downlink subcarriers to determine whether a semi-persistent resource is configured or reconfigured or an SPS retransmission is triggered. In such a situation, the more configured subcarriers, the more PDCCHs the UE needs to monitor. This may increase power consumption or SPS false alarm rates.

SUMMARY OF THE INVENTION

In one aspect the invention provides a method for handling semi-persistent transmission resources in a network terminal of a wireless communication system the supports carrier aggregation and semi-persistent scheduling (SPS). The method includes: establishing a radio resource control (RRC) connection with the UE via a cell containing an uplink carrier for transmission from the UE and a downlink carrier for reception by the UE; configuring a plurality of downlink carriers to the UE via a first RRC message; and transmitting a physical downlink control channel (PDCCH) signaling addressed to an SPS Cell radio network temporary identifier (SPS C-RNTI) of the UE on a specific carrier of the plurality of downlink carriers configured to the UE, wherein the PDCCH signaling instructs the UE to configure or reconfigure an SPS resource to the UE or to trigger an SPS retransmission.

In another aspect the invention provides a method for handling semi-persistent transmission resources in a user equipment (UE) of a wireless communication system that supports carrier aggregation and semi-persistent scheduling (SPS). The method includes: establishing a radio resource control (RRC) connection with a network terminal of the wireless communication system via a cell containing an uplink carrier for transmission from the UE and a downlink carrier for reception by the UE; receiving a first RRC message with information for configuring a plurality of downlink carriers to the UE; and monitoring for a physical downlink control channel (PDCCH) signaling addressed to an SPS cell radio network temporary identifier (SPS C-RNTI) only on a specific carrier of the plurality of downlink carriers configured to the UE, wherein the PDCCH signaling is used to obtain an SPS resource, to start SPS transmission, to update/release an SPS resource, or to perform an SPS retransmission.

In another aspect the invention provides a communication device for handling semi-persistent transmission resources in a user equipment (UE) of a wireless communication system that supports carrier aggregation and semi-persistent scheduling (SPS). The communication device includes: a processor configured to execute a program; and a memory coupled to the processor for storing the program, wherein the program instructs the processor to: establish a radio resource control (RRC) connection with a network terminal of the wireless communication system via a cell containing an uplink carrier for transmission from the UE and a downlink carrier for reception by the UE; receive a first RRC message with information for configuring a plurality of downlink carriers to the UE; and monitor for a physical downlink control channel (PDCCH) signaling addressed to an SPS cell radio network temporary identifier (SPS C-RNTI) only on a specific carrier of the plurality of downlink carriers configured to the UE, wherein the PDCCH signaling is used to obtain an SPS resource, to start SPS transmission, to update/release an SPS resource, or to perform an SPS retransmission.

These and other aspects of the invention are more fully comprehended upon review of his disclosure and the accompanying drawings.

DETAILED DESCRIPTION

The exemplary wireless communication systems, devices, and related methods described below employ a wireless communication system supporting broadband service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP2 UMB (Ultra Mobile Broadband), WiMax, or some other modulation techniques.

In particular, the exemplary wireless communication systems, devices, and methods described below may be designed to support one or more standards such as the standards offered by a consortium named "3rd Generation Partnership Project" referred to herein as 3GPP, including Document Nos. 3GPP TR 25.331 ("Radio Resource Control (RRC): Protocol specification (Release 8)") and 3GPP TSG-RAN2 R2-097507 ("Baseline CR Capturing MBMS for LTE Agreements"). The standards and documents listed above are hereby expressly incorporated herein.

Figure 1:
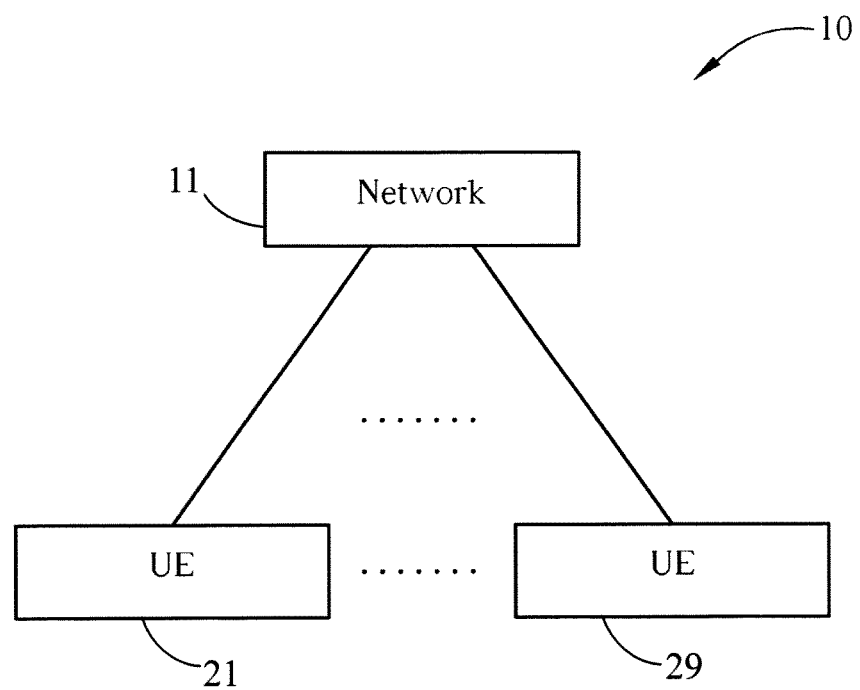
FIG. 1 is a schematic diagram of a wireless communication system.

FIG. 1 is a schematic diagram of a wireless communication system 10. The wireless communication system 10 is preferably an LTE advanced (LTE-A) system and includes a network terminal 11 and a plurality of user equipments (UEs) 21-29. In FIG. 1, the network terminal 11 and the UEs 21-29 illustrate the structure of the wireless communication system 10. Practically, the network terminal 11 may include many base stations (Node Bs), radio network controllers, and so on according to actual demands in a particular implementation. The UEs can be devices such as mobile phones, computer systems, etc.

Figure 2:
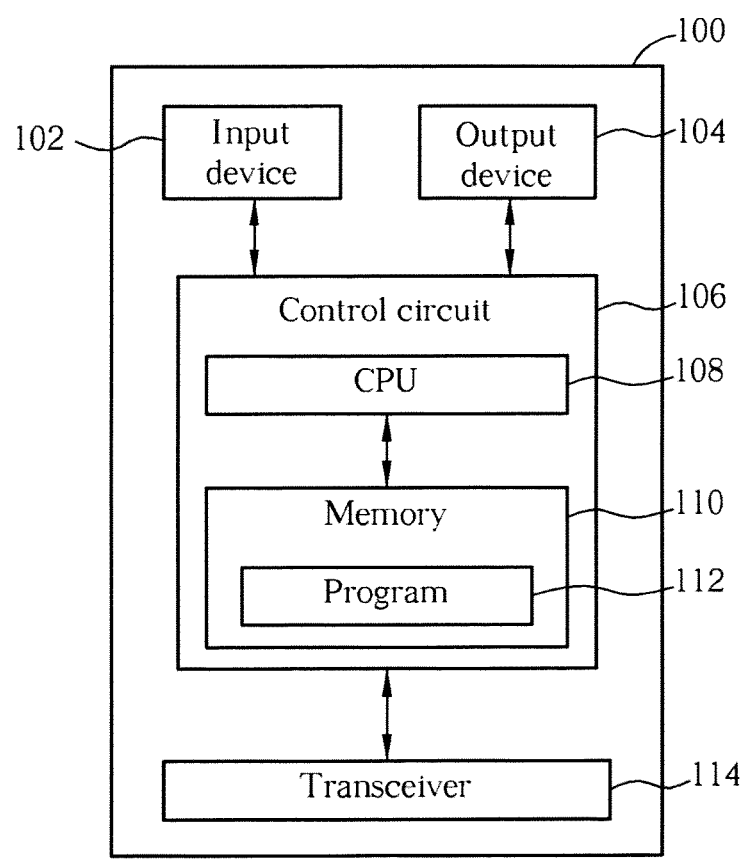
FIG. 2 is a block diagram of a wireless communication device.

FIG. 2 is a block diagram of a wireless communication device 100. The wireless communication device 100 may be utilized in the network terminal 11 and the UEs 21-29 in the wireless communication system of FIG. 1. For the sake of brevity, FIG. 2 only shows an input device 102, an output device 104, a control circuit 106, a central processing unit (CPU) 108, a memory 110, a program 112, and a transceiver 114 of the communication device 100. In the communication device 100, the control circuit 106 executes the program 112 in the memory 110 through the CPU 108 thereby controlling an operation of the communication device 100. The communication device 100 can receive signals input by a user through the input device 102, such as a keyboard, and can output images and sounds through the output device 104, such as a display or speaker. The transceiver 114 is used to receive and transmit wireless signals. The transceiver 114 delivers received signals to the control circuit 106 and wirelessly transmits signals generated by the control circuit 106. From a perspective of a communication protocol framework, the transceiver 114 may be associated with portions of Layer 1, and the control circuit 106 may be associated with portions of Layer 2 and Layer 3.

Figure 3:
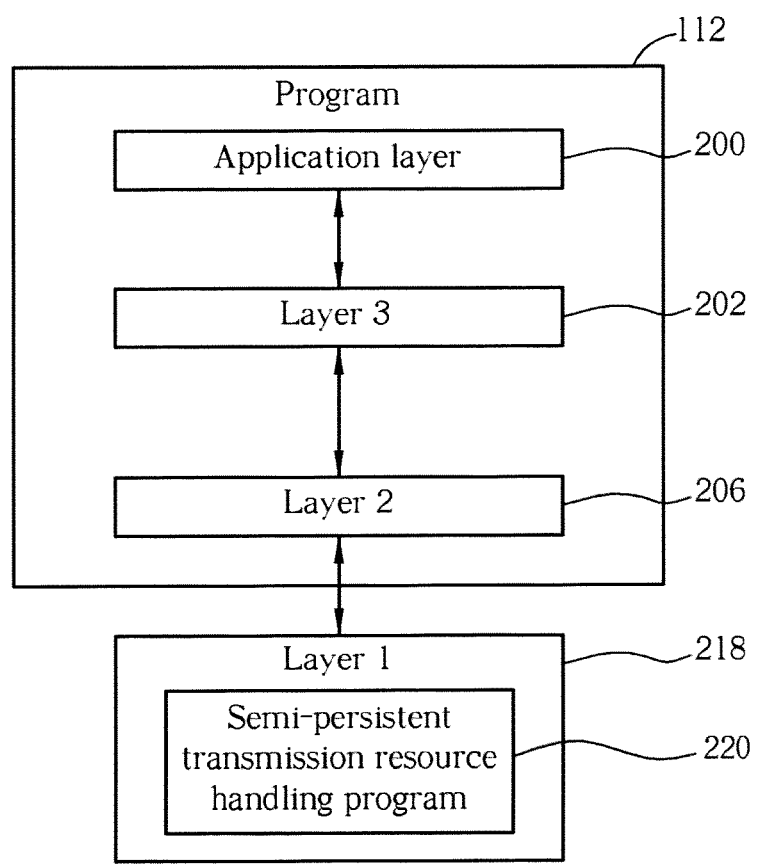
FIG. 3 is a diagram of a program for a wireless communication device.

FIG. 3 is a diagram of the program 112 of the communication device of FIG. 2. The program 112 includes an application layer 200, a Layer 3 202, and a Layer 2 206 and is coupled to a Layer 1 218. The Layer 3 202 performs radio resource control. The Layer 2 206 includes a radio link control (RLC) layer and a Medium Access Control (MAC) layer and performs link control. The Layer 1 218 performs physical connections.

In the LTE-A system, the Layer 1 218 and the Layer 2 206 may support carrier aggregation (CA), which enables the UE to perform data transmission and/or reception using multiple carriers. The LTE-A system, like the LTE system, and has two scheduling methods: dynamic scheduling (DS) and semi-persistent scheduling (SPS). After a network terminal sends the SPS configuration to a UE, the UE needs to monitor a physical downlink control channel (PDCCH) for signaling addressed to the SPS C-RNTI. A new data indicator (NDI) included in the PDCCH signaling indicates whether a semi-persistent resource is configured or reconfigured or an SPS retransmission is triggered. A semi-persistent transmission resource handling program 220 in the Layer 1 218 is used to reduce required power consumption and system resources for the UE to monitor for SPS C-RNTI messages in the PDCCH.

Figure 4:
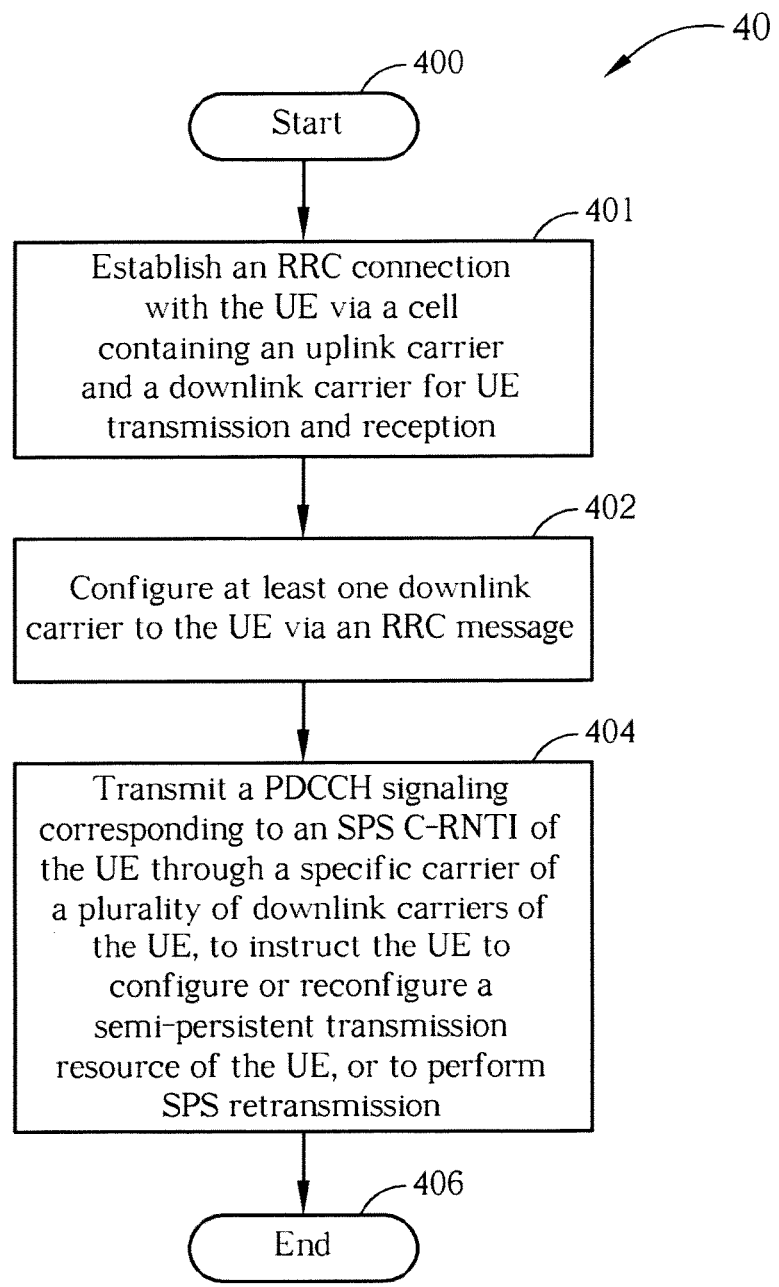
FIG. 4 is a flowchart of a process for transmitting signaling for semi-persistent scheduling.
Figure 5:
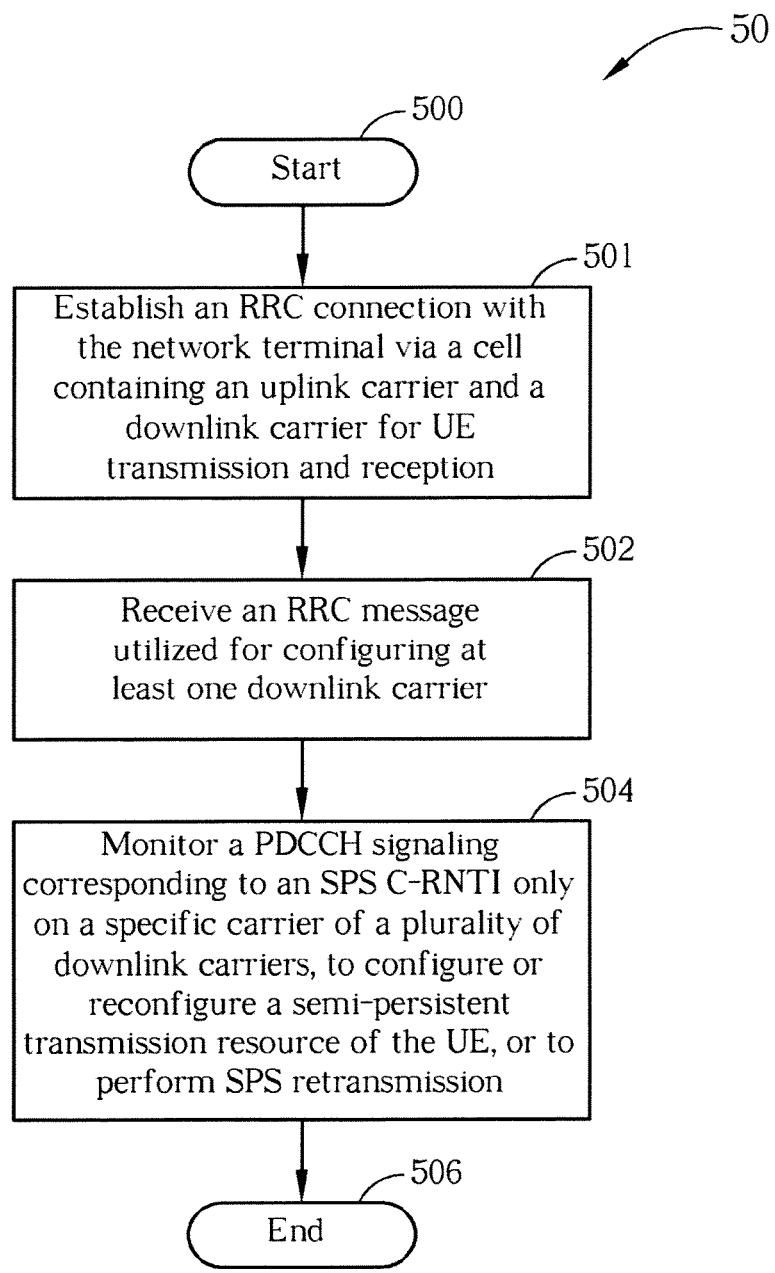
FIG. 5 is a flowchart of a process for receiving signaling for semi-persistent scheduling.

FIG. 4 and FIG. 5 are flowcharts of processes 40, 50, respectively. The process 40 is utilized in a network terminal of the wireless communication system 10, and the process 50 is utilized in a UE of the wireless communication system 10. The processes 40, 50 may cooperate to handle semi-persistent transmission resources and can be used in the semi-persistent transmission resource handling program 220 of a network terminal and a UE, respectively.

The process 40 illustrated in FIG. 4 is performed by a network terminal. The process may begin 400, for example, when the network terminal establishes communication with a UE.

In step 401, the process establishes a radio resource control (RRC) connection with the UE. The process may establish the RRC connection via a cell that contains an uplink carrier and a downlink carrier for UE transmission and reception.

In step 402, the process configures one or more downlink carriers for communication to the UE. The process configures the downlink carriers by sending a message over the RRC connection.

In step 404, the process transmits a PDCCH signaling addressed to an SPS C-RNTI of the UE. The process transmits the PDCCH signaling on a specific carrier of the downlink carriers allocated to the UE. The PDCCH signaling may indicate a configuration (or reconfiguration) of a semi-persistent transmission resource to the UE or may trigger an SPS retransmission. The process thereafter ends 406.

The process 50 illustrated in FIG. 5 is performed by a UE. The process may begin 500, for example, when a network terminal establishes communication with the UE.

In step 501, the process establishes an RRC connection with the network terminal. The RRC connection may be established via a cell that contains an uplink carrier and a downlink carrier for UE transmission and reception.

In step 502, the process receives an RRC message. The RRC message may be sent by the network terminal as described for step 402 of FIG. 4. The RRC message configures one or more downlink carriers for communication to the UE.

In step 504, the process monitors a PDCCH for signaling addressed to an SPS C-RNTI associated with the UE. The process monitors only on a specific carrier of the downlink carriers allocated to the UE. The signaling may indicate the UE to obtain an SPS resource, start SPS transmission, update or release an SPS resource, or to perform an SPS retransmission. Thereafter, the process ends 506.

As can be seen from the above, according to the process 40, after CA is configured, if the network terminal wants to configure or reconfigure a semi-persistent transmission resource to the UE or to trigger an SPS retransmission, the network terminal transmits a PDCCH signal addressed to an SPS C-RNTI of the UE on only a specific carrier. Correspondingly, according to the process 50, the UE monitors the PDCCH signaling addressed to the SPS C-RNTI on only the specific carrier. In other words, even when CA configures many carriers to the UE, the network terminal transmits the PDCCH signaling addressed to the SPS C-RNTI only on a specific carrier. Correspondingly, the UE only needs to monitor the specific carrier for obtaining the SPS resource, for starting SPS transmission, for SPS resource update/release, or for SPS retransmission. As a result, the SPS false alarm rate may be reduced. Power consumption of the UE may also be reduced.

Furthermore, the specific carrier used for PDCCH signaling is for a serving cell, i.e., the cell utilized for establishing the RRC connection between the UE and network terminal, (termed the primary cell). After CA is configured, only the primary cell supports uplink and downlink SPS; secondary cells do not.

In some embodiments, the network terminal can further include information in another RRC message utilized for providing SPS configuration to signal the specific carrier used for transmitting the PDCCH signaling to the SPS C-RNTI of the UE. This RRC message may be termed an RRC Connection Reconfiguration message. As a result, the UE can determine the carrier which should be monitored according to the information.

The RRC Connection Reconfiguration message utilized for providing SPS configuration includes an SPS configuration information element SPS-Config. The SPS configuration information element SPS-Config, in many embodiments, is only for a cell corresponding to the specific carrier in the processes 40 and 50. That is, the semi-persistent transmission resource is only configured for the cell.

The steps of a method or algorithm described in connection with aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, a DVD, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may include packaging materials.

Although the invention has been discussed with respect to various embodiments, it should be understood the invention comprises the novel and unobvious claims, and their insubstantial variations, supported by this disclosure.

What is claimed is:

1. A method for handling semi-persistent transmission resources in a network terminal of a wireless communication system that supports carrier aggregation and semi-persistent scheduling (SPS), the method comprising:
   establishing a radio resource control (RRC) connection with a user equipment (UE) via a primary cell containing an uplink carrier for transmission from the UE and a downlink carrier for reception by the UE;
   configuring a plurality of downlink carriers to the UE via a first RRC message;
   providing an SPS configuration to the UE via a second RRC message, wherein the SPS configuration includes configuration information only applicable to the primary cell; and
   transmitting a physical downlink control channel (PDCCH) signaling addressed to an SPS Cell radio network temporary identifier (SPS C-RNTI) of the UE only on the downlink carrier of the primary cell, wherein the PDCCH signaling instructs the UE to configure or reconfigure an SPS resource to the UE or to trigger an SPS retransmission.

2. The method of claim 1, wherein the first RRC message is an RRC Connection Reconfiguration message.

3. A method for handling semi-persistent transmission resources in a user equipment (UE) of a wireless communication system that supports carrier aggregation and semi-persistent scheduling (SPS), the method comprising:
   establishing a radio resource control (RRC) connection with a network terminal of the wireless communication system via a primary cell containing an uplink carrier for transmission from the UE and a downlink carrier for reception by the UE;
   receiving a first RRC message with information for configuring a plurality of downlink carriers to the UE;
   receiving a second RRC message providing an SPS configuration, wherein the SPS configuration includes configuration information only applicable to the primary cell; and
   monitoring for a physical downlink control channel (PDCCH) signaling addressed to an SPS cell radio network temporary identifier (SPS C-RNTI) of the UE only on the downlink carrier of the primary cell, wherein the PDCCH signaling is used to obtain an SPS resource, to start SPS transmission, to update/release an SPS resource, or to perform an SPS retransmission.

4. The method of claim 3, wherein the first RRC message is an RRC Connection Reconfiguration message.

5. A communication device for handling semi-persistent transmission resources in a user equipment (UE) of a wireless communication system that supports carrier aggregation and semi-persistent scheduling (SPS), the communication device comprising:
   a processor configured to execute a program; and
   a memory coupled to the processor for storing the program, wherein the program instructs the processor to:
      establish a radio resource control (RRC) connection with a network terminal of the wireless communication system via a primary cell containing an uplink carrier for transmission from the UE and a downlink carrier for reception by the UE;

receive a first RRC message with information for configuring a plurality of downlink carriers to the UE;

receive a second RRC message providing an SPS configuration, wherein the SPS configuration includes configuration information only applicable to the primary cell; and monitor for a physical downlink control channel (PDCCH) signaling addressed to an SPS cell radio network temporary identifier (SPS C-RNTI) of the UE only on the downlink carrier of the primary cell, wherein the PDCCH signaling is used to obtain an SPS resource, to start SPS transmission, to update/release an SPS resource, or to perform an SPS retransmission.

6. The communication device of claim 5, wherein the first RRC message is an RRC Connection Reconfiguration message.

* * * * *